United States Patent [19]

Johnson, Jr. et al.

[11] 4,297,005
[45] Oct. 27, 1981

[54] PERSISTENT MEMORY CELL

[75] Inventors: David W. Johnson, Jr., Pluckemin; Shobha Singh, Summit; LeGrand G. Van Uitert, Morristown; George J. Zydzik, Columbia, all of N.J.

[73] Assignee: Bell Telephone Laboratories, Incorporated, Murray Hill, N.J.

[21] Appl. No.: 51,807

[22] Filed: Jun. 25, 1979

[51] Int. Cl.³ .............................................. G02F 1/17
[52] U.S. Cl. .................................... 350/357; 252/408
[58] Field of Search ...................... 350/357, 353, 355; 252/408

[56] References Cited

U.S. PATENT DOCUMENTS 4,175,838 11/1979 Randin ................................. 350/357
4,183,631 1/1980 Kondo et al. ........................ 350/357

OTHER PUBLICATIONS

*Electronics*, "Solid-State Approach to Electrochromic Displays Holds Promise", *Electronics*, Jan. 18, 1979, pp. 67–68.
Goodenough et al., "Fast Na+-Ion Transport in Skeleton Structures", *Mat. Res. Bull.*, vol. 11, 1976, pp. 203–220.
McGeehin et al., "Review, Fast Ion Conduction Materials", *J. of Materials Science*, vol. 12, 1977, pp. 1–27.
Boukamp et al., "Fast Ionic Conductivity in Lithium Nitride", *Mat. Res. Bulletin*, vol. 13, 1978, pp. 23–32.
Levasseur et al., "Conductive Ionique du Lithium dans les Verves du Systeme", *Mat. Res. Bull.*, vol. 13, 1978, pp. 205–209.

*Primary Examiner*—James W. Davie
*Attorney, Agent, or Firm*—Walter G. Nilsen

[57] ABSTRACT

Display devices are described which contain, in addition to organic quinones and suitable organic solvent, a solid ionic conductor. Such display devices are advantageous because of exceptional persistence of the display. Thus, an image may be retained without application of electrical energy. In addition, these displays exhibit high optical contrast and low power consumption. Under certain conditions, these devices are nonlinear (exhibit sharp thresholds) which permit multiplexing. This is highly advantageous in display device applications.

45 Claims, 1 Drawing Figure

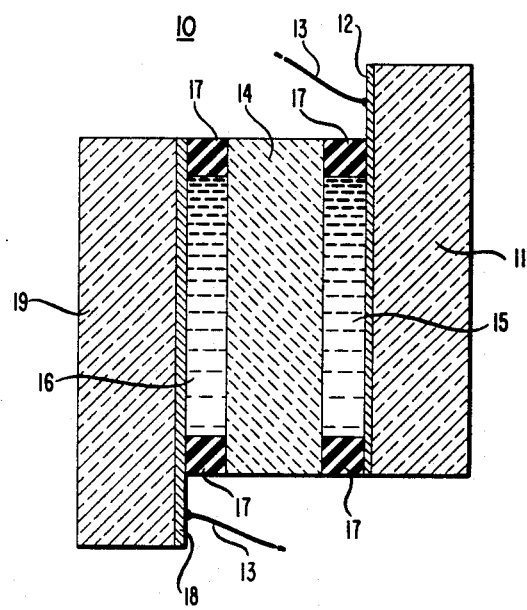

PERSISTENT MEMORY CELL

TECHNICAL FIELD

The invention is an electrochemical display device.

BACKGROUND OF THE INVENTION

The development of various integrated circuit devices such as calculators, watches, microprocessors, etc., has increased the importance of display devices. These integrated circuit devices and other similar devices process or store information which often requires rapid and frequent reading. Particularly desirable in such display devices are low power consumption, color, good visibility (high contrast and large viewing angle) and low cost. In many applications, display persistence is highly desirable, both to save electrical power and for operational convenience. Devices which exhibit display persistance need not have electrical energy applied to it to maintain a particular display. Thus, operationally, electrical energy is only applied (usually in the form of electrical pulses) when the display is changed.

Solid ionic conductors are used in a variety of applications including as solid electrolytes in batteries and in solid electrochromic ($WO_3$) displays (see *Solid Electrolytes*, edited by Paul Hagenmuller and W. Van Gool, Academic Press, New York, 1978 and *Electronics*, Jan. 18, 1979, p. 67).

SUMMARY OF THE INVENTION

The invention is a quinone-type display device comprising organic quinone, suitable solvent and suitable solid ionic conductor. A large variety of solid ionic conductors may be used provided the mobile ion is the cation and the cation is stable and compatible with the display cell. The sodium ionic conductors are preferred both because of easy availability of good sodium ionic conductors and stability of sodium ion. Also, a variety of sodium salts (e.g., NaI) are stable and have reasonable solubilities in the solvents used in these display devices. Lithium and potassium solid ionic conductors are also preferred for much the same reasons. Various other ingredients may be added to the solution part of the display system. Sodium salts, particularly NaI are most useful. Such salts may be present in any concentration in the organic solvent including a saturated solution with excess solid in contact with the solution. An extensive list of solid ionic conductors are given in a book entitled *Solid Electrolytes*, edited by Paul Hagenmuller and W. Van Gool, Academic Press, New York, 1978. Organic quinones are well known in the literature. They may be defined as unsaturated cyclic diketones with both oxygen atoms attached to carbon atoms in simple, fused, or conjugated ring systems—See *The Encyclopedia of Chemistry*—Clark & Hawley, Reingold, 1957. Other substances in the solution may include ammonium halides and quaternary ammonium salts, such as tetrabutylammonium iodide, tetrahexylammonium iodide and tetraheptylammonium iodide. Also, an opacifier may be added. Preferred opacifiers generally comprise insulator substance and semiconductor substance. Display devices made in accordance with the invention are persistent in that they retain their image even after applied power is removed. These display devices operate ordinarily at ambient temperatures (room temperature usually) and need not be heated to color or write into them. Such display devices can be operated with minimum power. They also exhibit a sharp threshold so that multiplexing is possible.

BRIEF DESCRIPTION OF THE DRAWING

The FIGURE shows a sectioned side view of a display device made in accordance with the invention.

DETAILED DESCRIPTION

In its broadest aspects, the invention is a quinone-type display device which contains an ionic conductor between the two electrodes. This ionic conductor, which divides electrolyte solution from each electrode, makes the display persistent so that an image produced by application of electrical energy to the electrodes stays after the electrical energy is removed.

Any solid ionic conductor may be used provided it is compatible with the display device and transports suitable cations.

A particularly attractive solid ionic conductor system in the β-alumina system described in detail by J. T. Kummer in an article entitled β-Alumina Electrolytes in Volume 7 of Progress in Solid State Chemistry, edited by H. Reiss and J. O. McCaldin, New York, 1972, pp. 141-175. Various cations are useful including $H_3O^+$, $Cu^+$, $Ga^+$, $NO^+$ and $In^+$. The most useful ions are $Na^+$, $K^+$, $Li^+$, $Rb^+$ and $NH_4^+$ with the best being $Na^+$. These ions are preferred (particularly $Na^+$) because of excellent ionic conductivity of the β-Alumina and the excellent stability of the ion.

Another preferred solid ionic conductor is a family of compounds, generally referred to as NASICON with the general formula $Na_{1+x}Zr_2Si_xP_{3-x}O_{12}$ with x varying from 0 to 3.0. These ionic conductors have been described in detail by J. B. Goodenough et al in the *Materials Research Bulletin*, 11, 203-220 (1976). Most favored range of x is from 1.8 to 2.4 because of high availability and transport velocity of the $Na^+$ ion.

Many other suitable solid ionic conductors are described by P. McGeehin and A. Hooper in an article entitled "Review of Fast Ion Conduction Matrials", *J. Material Science*, 12, 1-27 (1977). Particularly attractive is hollandite, with nominal formula $K_{1.6}Mg_{0.8}Ti_{7.2}O_{16}$. This substance is a particularly good potassium ion conductor. The compound $Li_3N$ is an exceptionally good lithium ion conductor (see Fast Ionic Conductivity in Lithium Nitride by B. A. Boukamp and R. A. Huggins, *Mat. Res. Bull.*, 13 pages 23-32, 1978). Glass systems are also useful. The glass system $B_2O_3$-$Li_2O$-LiCl is an exceptionally good ion conductor as is disclosed by A. Levasseur, et al, in an article entitled Conductive Ionique du Lithium Dans les Verves du Systeme in *Mat. Res. Bull.* 13, pages 205-209 (1978).

The ionic conductor is introduced so as to make the display persistent. This is usually done by dividing the display cell into two parts, one electrode in each part, and using the solid ionic conductor as the divider. Thus, ions must be conducted (or transported) through the solid conductor when the quinone changes oxidation state. It is believed that the persistence originates from the fact that an electric field gradient is required to transport ions through the solid ionic conductor.

Numerous quinones are useful in the display device provided the ordinary state (uncharged) is colorless or light in color and the charged state is colored. Choice of organic quinone usually depends on color selection and device stability. Organic quinones with up to 100 carbon atoms are useful in display devices. Typical active organic materials are benzoquinone, naphthaquinone, anthraquinone, benzanthrenequinone, diphenoquinone, diphenylquinone, dibenzanthraquinone, phenanthrenequinones, benz[a]anthracene-7,12 dione and substituted variations of these materials. Other quinones are violanthrone, isoviolanthrone, perylenequinone, chrysenequinone, pyrenequinone, benzpyrenequinone, pyranthrone, flavanthrone and anthanthrone. The quinone groups (di-ketones) may be located in various places in the molecular consistant with stability (e.g., 1,2-anthraquinone, 1,4-anthraquinone and 9,10-anthraquinone). Other typical quinones are disclosed in a book (2 volumes) entitled *The Chemistry of the Quinonoid Compounds* edited by Saul Patai, John Wiley and Sons 1974. A large variety of substituents may be attached to the organic quinones provided the compounds remain stable and are compatible with the display device.

Excellent results have been obtained with organic quinones with three to six aromatic rings (e.g., anthraquinone, benzanthraquinone etc.). A stabilizing effect is obtained by introducing certain substituents onto the aromatic rings. These substituents include hydrocarbon substituents such as other aromatic rings, aliphatic rings and straight chains and heterocyclic rings. Good results are obtained with alkane chains such as methyl, ethyl, tertiary butyl etc. Typical compounds which are readily available, pleasing in color and stable are 2-tertiary butylanthraquinone, 2-ethylanthraquinone, and benz-[α]anthracene-7,12 dione. In addition to organic quinone, the display device contains solvent, ionic compounds such as quaternary ammonium salts, ammonium halides, alkali halides, etc., and optionally an opacifier made up of insulator and/or semiconducting substance.

A large variety of solvents are useful in the display device. Preference is given to solvents that are highly stable to the chemical and physical conditions present in the display device. In particular, it should not decompose under the influence of the voltages used in the device nor react destructively with the other ingredients in the display device. It should provide good solubility for the organic quinones used in the display device and the various electrolytes used. The solvent should preferably have a large liquid range above and below room temperature (preferably melting point less than $-40°$ C. and boiling point greater than $120°$ C.).

The solvent should not easily give up protons (it should exhibit a very low concentration of dissociable protons) so as to prevent deterioration of contacts by reducing protons to elemental hydrogen. Proton concentrations should be at least two order of magnitude less than that of pure water. It is preferred that the equivalent pKa value in water should be greater than 9 and more preferably greater than 12.

Typical solvents are dimethyl and diethyl sulfoxide, N,N-dimethyl and N,N-diethyl formamide, diethyl malonate, ethyl acetoacetic ester, ketones such as acetone, esters, ethers and alcohols with high pKa values. Also useful are organic carbonates such as propylene carbonate, organic lactones, organic nitriles such as acetonitrile, nitrohydrocarbons such as nitromethanes, etc.

The solvents dimethylsulfoxide and N,N-dimethylformamide are preferred because of high solubility for the electrolyte and stability. One of these solvents (dimethylsulfoxide) has the advantage of great solubility for the electrolyte. This solvent is preferred only when the temperature of operation does not fall below zero degrees C. Mixed solvents may be used (i.e., a mixture of dimethylsulfoxide and N,N-dimethyl formamide) to obtain the advantage of high solubility and extend the temperature range of operation by lowering the melting point.

Any electrolytic solution may be used which is compatible with the other ingredients in the display device. Alkali-metal halides such as NaCl, KBr, NaI are useful as are ammonium halides such as $NH_4I$. Quaternary ammonium salts (iodide, bromide and chloride) are also useful including for example tetrabutyl ammonium iodide tetrahexyl ammonium iodide and tetraheptyl ammonium iodide. Mixtures of the above salts (e.g., ammonium iodide and tetrabutyl ammonium iodide and tetrabutyl ammonium bromide) are also useful.

It is advantageous in the case of alkali-metal halides to use the same cation as is used in the solid ionic conductor. Thus, with sodium $\beta$-Alumina or $Na_{1+x}Zr_2Si_xP_{3-x}O_{12}$ it is preferred to use a sodium halide such as NaI. Similarly, with $Li_3N$, Li I would be preferred as the alkali-metal halide in the solution. Also, KI would be preferred with hollandite.

Concentration ranges for the organic quinone should be as high as possible without causing precipitation. Typical ranges are about ¼ the concentration for saturation (for a particular solvent and temperature) to saturation. Precipitation of organic quinone should be avoided. Mixtures of organic quinones may be advantageous as for example to obtain a particular color or shade. It is preferred that the electrolyte be within 50 percent (on a molecular basis) of the saturation concentration.

Optionally, an opacifier may be added to the liquid part of the electrolyte to improve contrast ratio, lower power requirements and improve device reliability and lifetime. Generally, the opacifier is used in front of the disk of solid ionic conductors although it can be used on either side or both sides of the disk. The opacifier may be composed entirely of semiconductor material particularly if particle size is small enough to keep particles dispersed. It may also be composed entirely of insulator-type substance. Alternatively, it may be composed of two types of solid substances, one a semiconducting type and one an insulating type substance. The substances should be stable to the environment of the display device, particularly the driving voltage. It is believed that in addition to improving contrast, the semiconductor part of the opacifier acts as a dispersive contact facilitating in depth precipitation of fine colored particles.

A large variety of substances may be used as the semiconducting substance including the doped counterpart of various insulating substances, such as $TiO_2$, $Ta_2O_5$, $Nb_2O_5$. Either p-type or n-type may be used. Preferably, the semiconducting substances should have conductivities of at least $10^{-9}$ mhos/cm under an applied voltage at room temperature. Higher conductivities are preferred because of more rapid switching of the display and greater contrast of the display. Typical higher conductivities are at least $10^{-8}$ mhos/cm or even at least $10^{-7}$ mhos/cm. Higher conductivities up to about one mhos/cm also can be very useful. Conductivities often vary with applied voltage perhaps due to surface charge states. Upon injection of electrons during the application of voltage, the semiconductor often becomes lightly colored, increasing its conductivity during the coloring cycle. The semiconducting substance should also preferably be white or light colored in the non-active regions to provide maximum contrast with the quinoide salt making up the display. The semiconducting substance should be insoluble in the electrolyte and not be irreversibly affected by the conditions (voltage, electrode action, etc.) of the display device.

The insulating substance should preferably be white or light in color in order to provide maximum contrast with the substance plating out during operation of the display device. It should also be inert to the chemical and physical conditions of the display device, as described above, and preferably be sufficiently reflective to enhance the contrast for the display.

The concentration of the semiconductor and insulator substances in the opacifier may vary over large limits and still provide excellent device performance. Preferred concentrations often depend on the properties of semiconductor used, the particular semiconductor substances used, and the properties and identity of insulator substance used. Preferred concentration ranges for typical semiconductor and insulator substances are 1 to 90 weight percent semiconductor remainder insulator. Better results are obtained using a concentration range from 20 to 70 weight percent semiconductor, remainder insulator, particularly for 4A molecular sieve and $Al_2O_3$ or mixtures of these two insulator substances. Best results are obtained using 40 to 60 weight percent semiconductor remainder insulator substance.

Small particle size is also highly advantageous because of the increased dispersion of the deposits, and resolution of the display. Particle sizes less than five microns are preferred. Generally, semiconductor substances and insulator substances have a range of particle sizes. For the display systems described here, it is preferred that the average particle size is less than five microns. Still smaller particle sizes are advantageous where obtainable in a suitable semiconductor or insulator substance. For example, for either semiconductor or insulator substance, average particle size less than one micron is even more preferred.

A large variety of materials may be used as the semiconducting substance including mixtures of various substances. High optical index of refraction is preferred because of greater reflecting characteristics which increase the optical contrast of the display device. Preferred are white transition-metal oxides such as $TiO_2$, $GeO_2$, $ZrO_2$, $Nb_2O_5$ and other compounds containing Ti, Ge, Zr, Nb and Ta. Transition metals are metals with partially filled d shells. These substances should contain impurities or dopants to make them semiconducting. The selection of impurity depends on the basis substance chosen. For example, the valence of the impurity of dopant cation should either be less than (for p-type semiconductor) or greater than (for n-type semiconductor) the cation of the basic substance. Also, the ionic radius of the impurity cation should be approximately the same as the cation of the basic substance.

Although the impurity concentration in the semiconductor substance may vary over large limits, particularly good results are obtained in the range of 0.001 to 1.0 weight percent. For typical semiconductors, best results are obtained in the range from 0.005 to 0.025 weight percent.

An excellent, low cost semiconductor material is reagent grade $TiO_2$. This grade $TiO_2$ has sufficient impurities to make it semiconducting. Various impurities may be used as described above. A particularly effective impurity for $TiO_2$ is iron in the concentration range of 0.005 to 0.025 weight percent.

Various insulating substances may be used provided they are insoluble and inert to the conditions of the display device. Again, high reflectivity and white or light color is desirable to increase light reflection and insure good optical contrast. Typical insulating substances are BeO, MgO, ZnO, $Al_2O_3$, $Ga_2O_3$, $Sc_2O_3$, $Y_2O_3$, $La_2O_3$, $Gd_2O_3$, $SiO_2$, and mixed oxide compounds of the above such as $BeAl_2O_4$, $ZnGa_2O_4$, $MgAl_2O_4$, $Be_3Al_2Si_3O_{12}$, $GdAlO_3$, etc. Also useful are insoluble mixed-oxide compounds containing alkali-metal ions. Typical examples are $NaAlSi_2O_6$ and $NaYO_2$. Transition-metal oxides may also be used provided they are insoluble and do not contain impurities which make them semiconducting. Typical examples are $TiO_2$, $BaTiO_3$, $ZrO_2$ $KTaO_3$, etc.

Particularly good results for low threshold displays are obtained by the use of alkali-metal alumino silicates (zeolites commercially known as molecular sieves). This is believed to be due to small particle size and the fact that they decompose sufficiently to induce a permanent presence of colored anthraquinoide particles that can be modulated electrically. Zeolites are readily available and inexpensive. These substances may offer other advantages such as absorption of water inadvertently entering the display device and absorption of gas products. These properties increase device lifetime. The compound $NaAlSi_2O_8$ (commercially known as 4A molecular sieve) is preferred for low threshold displays because of extremely small particle size and easy availability. Mixtures of compounds are often useful as the insulator substance. A typical example is $NaAlSi_2O_8$ and $Al_2O_3$. For $TiO_2$ as the semiconductor substance and $NaAlSi_2O_8$ as the insulator substance, a concentration range from 30 to 70 weight percent semiconductor, remainder insulating substance gives excellent results.

Useful opacifier compositions are as follows:
a. 1 gm $TiO_2$-2 gm 4A molecular sieve.
b. 1 gm $TiO_2$-1 gm $Al_2O_3$.
c. 1 gm $TiO_2$-1 gm 4A sieve-4 gm $Al_2O_3$.
d. 1 gm $TiO_2$-2 gm $Al_2O_3$.

The reference cell may vary in structure depending on application and use. Generally, the reference cell consists of two transparent substrates (e.g., glass or plastic), which enclose a volume containing the active medium, often in the form of a paste or liquid. A solid piece of ionic conductor separates the cell into two compartments with an electrode in each compartment. The compartments are sealed so as to prevent ions from migrating from one compartment to another except through the ionic conductor. Electrical contact with the active medium may be provided in a variety of ways, including transparent contacts (e.g., indium-tin oxide, $SnO_2$, etc.) mounted on the inside (side facing and in contact with the active medium) of the transparent substrates. Polarity is arranged so that electrodeposition occurs on the front face. The conducting material may be put down on the transparent substrates in predetermined shapes so as to form numbers, letters, etc. Various geometric shapes for producing figures, letters, numbers etc. may also be used. A typical example is the seven segment numeral display extensively used in display devices as calculators, watches, etc.

Some aspects of the structure of the display are given by L. Mantell and S. Zaromb in *J. Electrochemical Society* 109, 992–993 (1962), L. G. Van Uitert, et al, *Applied Physics Letters* 34, p. 232 (1979).

In general, high concentration ranges are preferred because of lower power consumption and more distinct displays. For the organic quinone, a concentration between half saturation and saturation is generally preferred. Concentrations in the range from 0.005 to 0.30 grams per gram of solvent are useful for the organic quinone with 0.01 to 0.20 preferred. This concentration range gives a distinct display at low power consumption. Electrolyte composition may also vary over large limits. Thickeners such as cellulose acetate or polyvinyl acetate may also be used. They are useful up to a concentration of 0.25 grams per gram of solvent and preferred in the range of from 0.005 to 0.08.

When opacifier comprises $TiO_2$ and $Al_2O_3$, useful concentration ranges are 0.010 to 0.50 grams $TiO_2$ per gram of solvent and 0.100 to 1.00 grams $Al_2O_3$. Preferred ranges are 0.050 to 0.30 grams of $TiO_2$ per gram solvent and 0.200 to 0.70 grams of $Al_2O_3$ per gram of solvent. A typical solvent is N,N-dimethylformamide.

Several examples of cell compositions that provide for a sharp threshold may serve to illustrate the invention. The first cell (cell A) contained N,N' dimethyl formamide, 2-tertiary butyl anthraquinone, tetrabutyl ammonion iodide, NaI, and an opacifier comprising semiconducting $TiO_2$ and zeolite ($NaAlSi_2O_6$). The solid ionic conductor was $Na_3Zr_2Si_2PO_{12}$. The mole ratios were 1.00, 0.06, 0.02, 0.03, 0.25 and 0.20. In cell B, the zeolite is replaced by fine alumina powder. In cell C, a small amount of cellulose acetate is added. In cell D, a small amount of ammonium iodide and AgI in N,N' dimethyl formamile is added.

On cycling, cell A exhibited a red display with a threshold voltage of 1.5 volts which decreases to 1.2 volts with cycling. The latter value is the threshold value for ionic conduction through the barrier. Persistence was excellent (several hours) as was power used and optical contrast ratio. Similar results were obtained for cell B where alumina is used instead of zeolite. Cell C acted much like cel B but cell D exhibited a shorter persistance time. Substituting benz[α]anthracene-7,12 dione for 2-tertiary-butyl anthraquinone changes display color to green.

The invention is conveniently illustrated by a description of the figure. The figure shows a typical display device 10 made in accordance with the invention. It comprises front transparent glass substrates 11 front transparent electrical electrode 12 and electrical contact 13. The solid ionic conductor 14 transverses the cell and divides the liquid into two cavities, front cavity 15 and rear cavity 16. Seals 17 are used to insure that liquid cannot pass from front cavity 15 to rear cavity 16. The rear electrode 18 need not be patterned since it is not visible from the front. The rear substrate 19 need not be transparent. The front transparent electrical electrode is usually patterned to yield the desired display (numbers, letters, etc.).

What is claimed is:

1. An electrochemical display device comprising:
   (a) first and second electrodes;
   (b) electrochemical solution in contact with the first and the second electrodes;
   (c) said electrochemical solution comprising:
      i. organic quinone which changes color under the influence of an electrical signal,
      ii. electrolyte,
      iii. organic solvent capable of dissolving said organic quinone;
   (d) characterized in that a solid cation ionic conductor separates the device into two cavities, each with its own electrode, one comprising the first electrode and the other comprising the second electrode and the two cavities are at least partially filled with said electrochemical solution.

2. The electrochemical display device of claim 1 in which the cation ionic conductor is β-alumina.

3. The electrochemical display device of claim 2 in which the cation in the cation ionic conductor is selected from the group consisting of $Na^+$, $K^+$, $Li^+$, $Ag^+$, $Rb^+$, $Tl^+$, $NH_4^+$, $In^+$, $NO^+$, $Ga^+$, $Cu^+$, $H_3O^+$.

4. The electrochemical display device of claim 3 in which the cation is $Na^+$.

5. The electrochemical display device of claim 1 in which the cation ionic conductor is $Na_{1+x}Zr_2Si_{x}P_{3-x}O_{12}$ where x varies from 0 to 3.0.

6. The electrochemical display device of claim 1 in which x varies from 1.8 to 2.4.

7. The electrochemical display device of claim 1 in which the cation ionic conductor is hollandite with nominal formula $K_{1.6}Mg_{0.8}Ti_{7.2}O_{16}$.

8. The electrochemical display device of claim 1 in which the cation ionic conductor is $Li_3N$.

9. The electrochemical display device of claim 1 in which the cation conductor is a $B_2O_3$-$Li_2O$-$LiCl$ glass.

10. The electrochemical display device of claim 1 in which the cation is an alkali-metal ion.

11. The electrochemical display device of claim 10 in which the cation is sodium ion.

12. The electrochemical display device of claim 1 in which the organic quinone has up to 100 carbon atoms.

13. The electrochemical display device of claim 12 in which the organic quinone contains three to six aromatic rings.

14. The electrochemical display device of claim 12 in which the organic quinone contains hydrocarbon substituents selected from the group consisting of aromatic rings, aliphatic rings, heterocyclic rings and aliphatic groups.

15. The electrochemical display device of claim 14 in which the hydrocarbon substituent is an alkane group.

16. The electrochemical display device of claim 14 in which the organic quinone is selected from the group consisting of 2-ethylanthraquinone, 2-tertiary-butylanthraquinone and benz[α]anthracene-7,12 dione.

17. The electrochemical display device of claim 1 in which the solvent is selected from the group consisting of dimethylsulfoxide, N,N-diethylformamide, and N,N-dimethylformamide.

18. The electrochemical display device of claim 1 in which the electrolyte comprises alkali-metal halide.

19. The electrochemical display device of claim 18 in which the electrolyte comprises sodium iodide.

20. The electrochemical display device of claim 1 in which the electrolyte comprises ammonium halide.

21. The electrochemical display device of claim 20 in which the electrolyte comprises ammonium iodide.

22. The electrochemical display device of claim 1 in which the electrolyte comprises quaternary ammonium halide.

23. The electrochemical display device of claim 22 in which the electrolyte comprises quaternary ammonium iodide.

24. The electrochemical display device of claim 23 in which the electrolyte comprises tetrabutylammonium iodide, tetrahexylammonium iodide or tetraheptylammonium iodide.

25. The electrochemical display device of claim 1 in which the electrochemical solution comprises in addition opacifier.

26. The electrochemical display device of claim 25 in which the opacifier comprises solid semiconductor substances and solid insulator substance.

27. The electrochemical display device of claim 26 in which the semiconducting substance has a conductivity of at least $10^{-9}$ mhos/cm at room temperature.

28. The electrochemical display device of claim 26 in which the opacifier comprises 1–90 weight percent solid semiconductor substance, remainder solid insulator substance.

29. The electrochemical display device of claim 26 in which the opacifier comprises 20–70 weight percent solid semiconductor substance remainder solid insulator substance.

30. The electrochemical display device of claim 29 in which the opacifier consists essentially of 40–60 weight percent solid semiconductor substance, remainder solid insulator substance.

31. The electrochemical display device of claim 26 in which the solid semiconductor substance consists essentially of at least one suitably doped compound selected from the group consisting of uncolored, transition metal oxides.

32. The electrochemical display device of claim 31 in which the solid semiconducting substance consists essentially of at least one suitably doped compound selected from the group consisting of $TiO_2$, $ZrO_2$, $GeO_2$, $Nb_2O_5$, and $Ta_2O_5$.

33. The electrochemical display device of claim 32 in which the dopant concentration ranges from 0.001 to 1.0 weight percent.

34. The electrochemical display device of claim 32 in which the semiconductor material is doped $TiO_2$.

35. The electrochemical display device of claim 34 in which the dopant is iron in the concentration range of 0.005 to 0.025 weight percent.

36. The electrochemical display device of claim 26 in which the insulating substance is selected from the group consisting of BeO, MgO, ZnO, $Al_2O_3$, $Ga_2O_3$, $Sc_2O_3$, $Y_2O_3$, $La_2O_3$, $Gd_2O_3$, $SiO_2$, $Gd_2O_3$, $SiO_2$, $BeAl_2O_4$, $ZnGa_2O_4$, $BeAl_2O_4$, $ZnGa_2O_4$, $MgAl_2O_4$, $Be_3Al_2Si_3O_{12}$, $GdAlO_3$, $NaAlSi_2O_6$ and $NaYO_2$.

37. The electrochemical display device of claim 26 in which the insulator substance consists essentially of a transition metal oxide sufficiently pure to be insulating.

38. The electrochemical device of claim 37 in which the insulating substance is selected from the group consisting of $NaAlSi_2O_5$ and $Al_2O_3$.

39. The electrochemical device of claim 1 in which the electrochemical solution comprises in addition silver halide.

40. The electrochemical device of claim 39 in which the electrochemical solution comprises in addition ammonium halide.

41. The electrochemical device of claim 40 in which the electrochemical solution comprises in addition quaternary ammonium halide.

42. The electrochemical device of claim 41 in which the halide is iodide.

43. The electrochemical device of claim 1 in which the electrochemical solution comprises in addition a halogen.

44. The electrochemical device of claim 43 in which the halogen is iodine.

45. The electrochemical device of claim 1 in which the organic quinone is added as a quinoide salt.

* * * * *